US011309695B2

(12) United States Patent
Laine et al.

(10) Patent No.: US 11,309,695 B2
(45) Date of Patent: Apr. 19, 2022

(54) CABLE SEALING DEVICE FOR AN ELECTRICAL JUNCTION BOX

(71) Applicant: Volvo Group Canada Inc., Sainte-Claire (CA)

(72) Inventors: Yves Laine, Lévis (CA); François Matte, Quebec (CA); Guillaume Huppe, Sainte-Marie (CA)

(73) Assignee: VOLVO GROUP CANADA INC., Sainte-Claire (CA)

( * ) Notice: Subject to any disclaimer, the term of this patent is extended or adjusted under 35 U.S.C. 154(b) by 338 days.

(21) Appl. No.: 16/313,419

(22) PCT Filed: Jun. 27, 2016

(86) PCT No.: PCT/CA2016/000180
§ 371 (c)(1),
(2) Date: Dec. 26, 2018

(87) PCT Pub. No.: WO2018/000074
PCT Pub. Date: Jan. 4, 2018

(65) Prior Publication Data
US 2019/0165556 A1    May 30, 2019

(51) Int. Cl.
*H02G 3/08* (2006.01)
*H02G 3/22* (2006.01)

(52) U.S. Cl.
CPC .............. *H02G 3/088* (2013.01); *H02G 3/083* (2013.01); *H02G 3/22* (2013.01)

(58) Field of Classification Search
CPC .......... H02G 3/088; H02G 3/083; H02G 3/22; H02G 3/0616; F16J 15/08; F16J 15/062
See application file for complete search history.

(56) References Cited

U.S. PATENT DOCUMENTS 918,969 A * 12/1908 Rober ...................... H02G 3/22
174/554
2,661,120 A * 12/1953 Miller ................... F16L 55/132
220/304
(Continued)

FOREIGN PATENT DOCUMENTS

DE    202014104367    * 10/2014    ............... H02G 3/22
FR       2699752 A1 *  6/1994    ............... F16L 5/10
(Continued)

OTHER PUBLICATIONS

International Search Report and Written Opinion for PCT/CA2016/000180, dated Sep. 20, 2016, 7 pages.

*Primary Examiner* — Paresh Paghadal
(74) *Attorney, Agent, or Firm* — Withrow & Terranova, PLLC (57) ABSTRACT

A cable sealing device for an electrical junction box includes a centering frame mountable at a hole in a wall of the junction box, a first clamping plate having a plurality of cable passage holes, the first clamping plate being disposed on a first side of the centering frame within the first seat, a second clamping plate having an equal plurality of cable passage holes, the second clamping plate being disposed on a second side of the centering frame opposite the first side wherein the cable passage holes of the first clamping plate are aligned with the cable passage holes of the second clamping plate to define a plurality of cable passages and, a sealing membrane disposed between the first clamping plate and the flange of the centering frame, wherein portions of the sealing membrane are exposed at the plurality of cable passages and wherein at least one exposed membrane portion has a perforation to accept a cable.

18 Claims, 6 Drawing Sheets

(56) References Cited

U.S. PATENT DOCUMENTS

| | | | | |
|---|---|---|---|---|
| 3,569,608 | A | * | 3/1971 | Ance ................. H02G 15/013 174/93 |
| 4,789,759 | A | | 12/1988 | Jones |
| 4,850,898 | A | * | 7/1989 | Gallusser ............ H01R 13/424 439/595 |
| 6,957,971 | B2 | * | 10/2005 | Wu ................... H01R 13/5213 439/320 |
| 7,705,240 | B2 | * | 4/2010 | Armstrong ............. H02G 3/20 174/74 R |
| 8,675,338 | B2 | * | 3/2014 | Teske .................. A61N 1/3754 361/302 |
| 8,716,607 | B2 | * | 5/2014 | Chang .................. H05K 5/069 174/657 |
| 2003/0201112 | A1 | * | 10/2003 | Sridhar .................. H01J 5/40 174/50.59 |
| 2008/0060844 | A1 | * | 3/2008 | Teske .................. A61N 1/372 174/667 |
| 2008/0224419 | A1 | * | 9/2008 | Mullaney ............... F16L 5/08 277/602 |
| 2013/0014974 | A1 | * | 1/2013 | Burke ................. G02B 6/4444 174/135 |
| 2013/0234405 | A1 | * | 9/2013 | Beele ................... F16L 5/10 277/606 |

FOREIGN PATENT DOCUMENTS

| | | |
|---|---|---|
| FR | 2699752 A1 | 6/1994 |
| IN | 2675/CHE/2008 A | 5/2010 |
| JP | H09252517 A | 9/1997 |
| JP | H09312927 A | 12/1997 |
| JP | 2002369334 A | 12/2002 |

\* cited by examiner

CABLE SEALING DEVICE FOR AN ELECTRICAL JUNCTION BOX

This application is a 35 USC 371 National Phase filing of International Application No. PCT/CA2016/000180, filed Jun. 27, 2016, the disclosure of which is incorporated herein by reference in its entirety.

FIELD OF THE INVENTION

The invention is directed to a device for carrying and sealing cables penetrating a wall of an electrical junction box for a vehicle, and more particularly, a device for carrying electrical cables through a wall of a rear junction box of a motor coach.

BACKGROUND AND SUMMARY OF THE INVENTION

In motor coaches, buses, and similar vehicles, the engine compartment is located at the rear of the vehicle frame. An electrical junction box is typically disposed in the engine compartment. Electrical cables, for example, the battery cables and engine cables, pass through a bulkhead fitting in a wall of the junction box for connection at terminals inside the junction box. There is a need provide a sealed fitting where the cables pass through the wall of the junction box to prevent dirt and water in the engine compartment from entering the junction box.

The invention is directed to a bulkhead fitting for a wall of an electrical junction box that provides a seal against dust and water penetration into the junction box.

According to the invention, a bulkhead fitting includes a centering frame mountable at a hole in a wall of the junction box, the centering frame including a first rim and a flange defining a first seat, an edge of the flange defining a central opening, a first clamping plate having a plurality of cable passage holes, the first clamping plate being disposed on a first side of the centering frame within the first seat, a second clamping plate having an equal plurality of cable passage holes, the second clamping plate being disposed on a second side of the centering frame opposite the first side wherein the cable passage holes of the first clamping plate are aligned with the cable passage holes of the second clamping plate to define a plurality of cable passages, and a sealing membrane disposed between the first clamping plate and the flange of the centering frame, wherein portions of the sealing membrane are exposed at the plurality of cable passages and wherein at least one exposed membrane portion has a perforation to accept a cable.

The perforation in the sealing membrane is preferably configured for a press fit with a cable for that cable passage to provide a water-tight and dust-tight seal.

According to the invention, the first clamping plate has a fastening post extending from a surface thereof, the first clamping plate being disposed on a first side of the centering frame within the first seat and with the fastening post extending through the central opening. The second clamping plate has an aperture to receive the fastening post. The fastening post is threaded and the device includes a threaded nut engaged on a portion of the fastening post extending from the second clamping plate, the post and nut applying clamping force between the first clamping plate and second clamping plate.

When the clamping force is applied by the fastening post and nut, the sealing membrane is pressed between the first clamping plate and the flange to provide a water-tight and dust-tight seal.

According to another aspect of the invention, the sealing membrane has an aperture configured to receive the fastening post in a press-fit to provide a water-tight and dust-tight seal.

The fastening post may be molded into the first clamping plate, or alternatively, the fastening post may be carried in a post hole formed in the first clamping plate.

The centering frame includes a second rim opposite the first rim, the flange being disposed between the first rim and the second rim, the second rim defining a second seat. The second clamping plate is disposed in the second seat.

According to another aspect of the invention, the first clamping plate comprises a cable support cradle at each of the cable passage holes. The second clamping plate may alternatively or additionally include a cable support cradle at each of the cable passage holes.

According to another aspect of the invention, the first clamping plate and the second clamping plate may be disc shaped or triangularly-shaped and a single fastening post and single aperture are centrally located respectively on the first clamping plate and second clamping plate.

The first clamping plate and the second clamping plate may, alternatively, be rectangular, and a first fastening post and a second fastening post may extend from the first clamping plate through a respective first aperture and second aperture in the second clamping plate, the first fastening post and the second fastening post being located at a central portion of the first clamping plate, and the first aperture and the second aperture being located at a central portion of the second clamping plate.

DETAILED DESCRIPTION OF THE INVENTION

Figure 1:
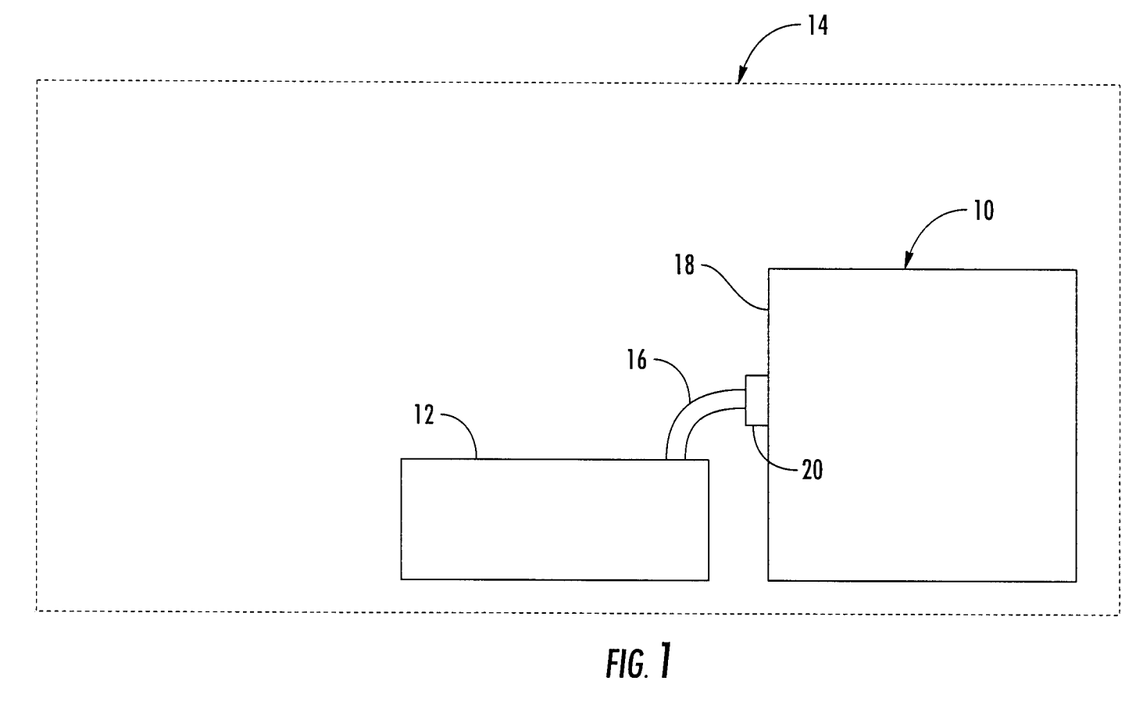
FIG. 1 is a schematic view of a vehicle junction box with a cable sealing device according to the invention.

FIG. 1 is a schematic view of a junction box 10 and battery array 12 for a motor coach, bus, or similar vehicle (not illustrated). The junction box 10 and battery array 12 may be located in the engine compartment 14 of the vehicle, which is typically at the rear of the vehicle. Battery cables 16 supply electrical power from the batteries to various vehicle circuits and are connected in the junction box 10. The cables 16 pass into the junction box 10 guided and supported by a fitting 20 mounted in a hole in a wall 18 of the junction box. To prevent exhaust fumes, water, dirt, dust, and other contaminants from entering the junction box 10, the fitting 20 according to the invention provides a seal against contaminants. The device according to the invention has been designed to meet and has been tested by the inventors as meeting International Protection Marking IP65 for dust and water ingress protection.

Figure 2:
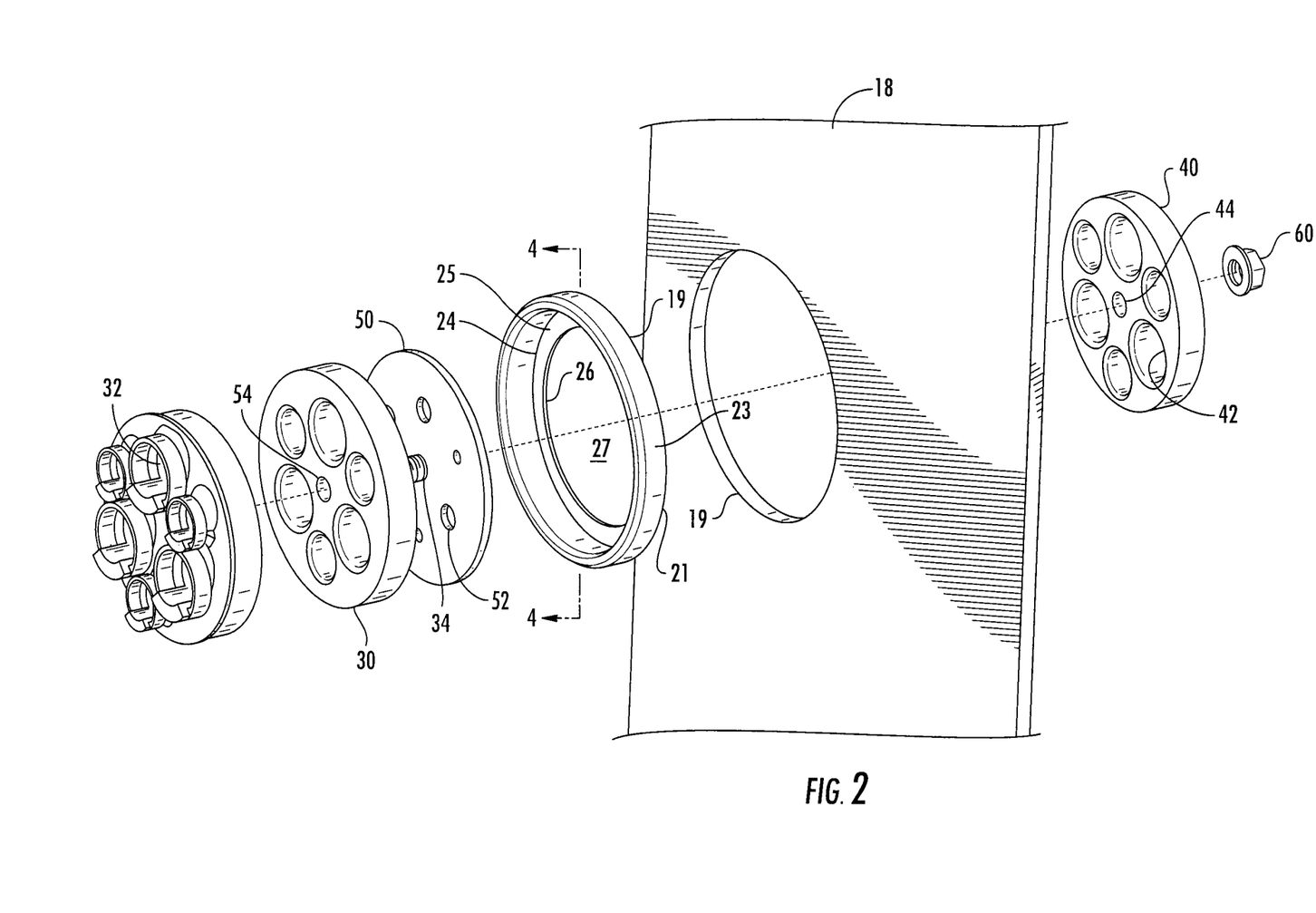
FIG. 2 is an exploded view of a cable sealing device according to an embodiment of the invention.
Figure 3:
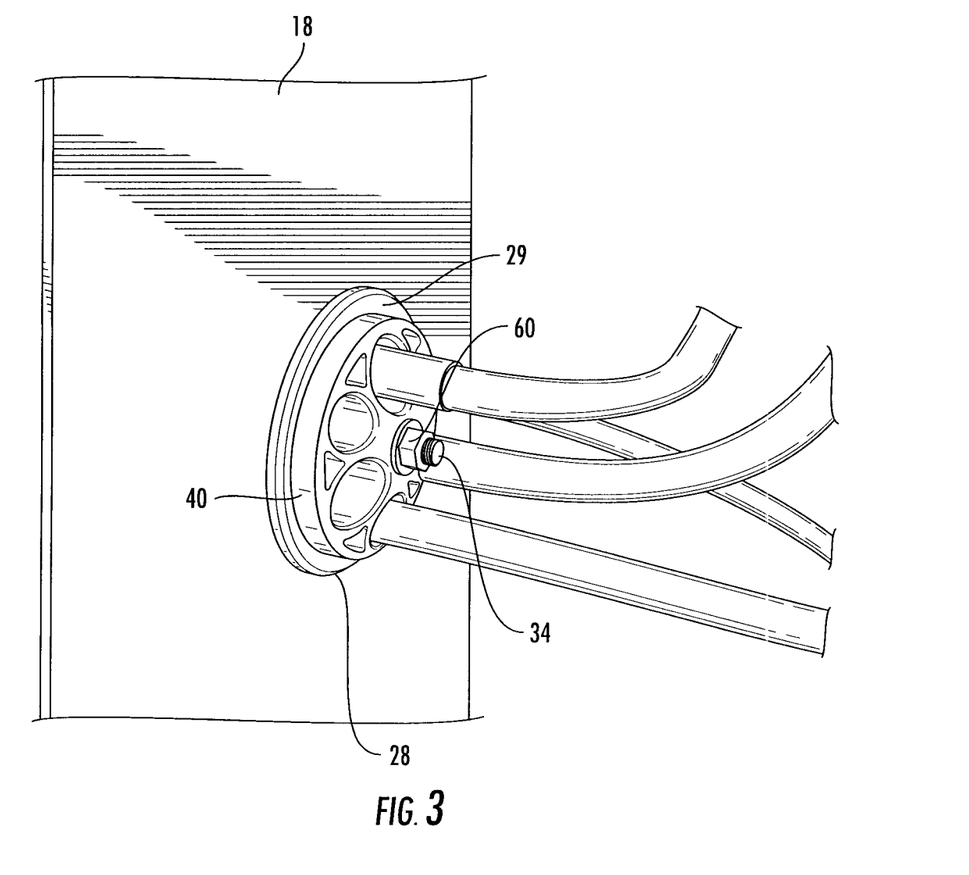
FIG. 3 is a view of the cable sealing device seen from inside a junction box.

FIG. 2 is an exploded view of a cable sealing device 20 or bulkhead fitting for the wall 18 of a junction box according to an embodiment of the invention. The fitting 20 includes a first clamping plate 30 having a plurality of cable passage holes 32, a second clamping plate 40 having an equal plurality of cable passage holes 42, and a sealing membrane 50 disposed between the first clamping plate and the second clamping plate. FIG. 3 shows a view from inside the junction box wall 18 of the second clamping plate 40 mounted on the wall.

The first clamping plate 30 and the second clamping plate 40 may be made of rigid material, such as a plastic or composite material.

The first clamping plate 30, second clamping plate 40 and sealing membrane 50 are each integral components, that is, each comprises a single part. When the device is assembled, the first clamping plate 30 and the second clamping plate 40 are fastened together with the sealing membrane 50 clamped between the plates and the respective cable passage holes 32, 42 in alignment. Portions of the sealing membrane 50 are exposed at the plurality of cable passage holes 32, 42 in the clamping plates 30, 40. At least one exposed membrane portion has a perforation 52 to accept a cable.

The cable passage holes 32, 42 may be of various diameters to accommodate cables of different sizes. In the embodiment illustrated in FIGS. 2 and 3, cable passage holes 32, 42 of two diameters are shown. Other arrangements are possible.

The first clamping plate 30 has a fastening post 34 extending from a surface thereof that faces the sealing membrane 50. The sealing membrane 50 has an aperture 54 to receive the fastening post 34. The aperture 54 is configured for a press-fit with the fastening post 34 to provide a water- and dust-tight seal. The second clamping plate has an aperture 44 that aligns with the membrane aperture 54 to receive the fastening post 34. The fastening post 34 extends from the first clamping plate 30 through the sealing membrane 50 and second clamping plate 40. The fastening post 34 is preferably a threaded post. As may be seen in FIG. 3, a nut 60 is engaged on the fastening post 34. When tightened down on the fastening post 34, the nut 60 applies clamping force to the first 30 and second 40 clamping plates and the sealing membrane 50.

Figure 4:
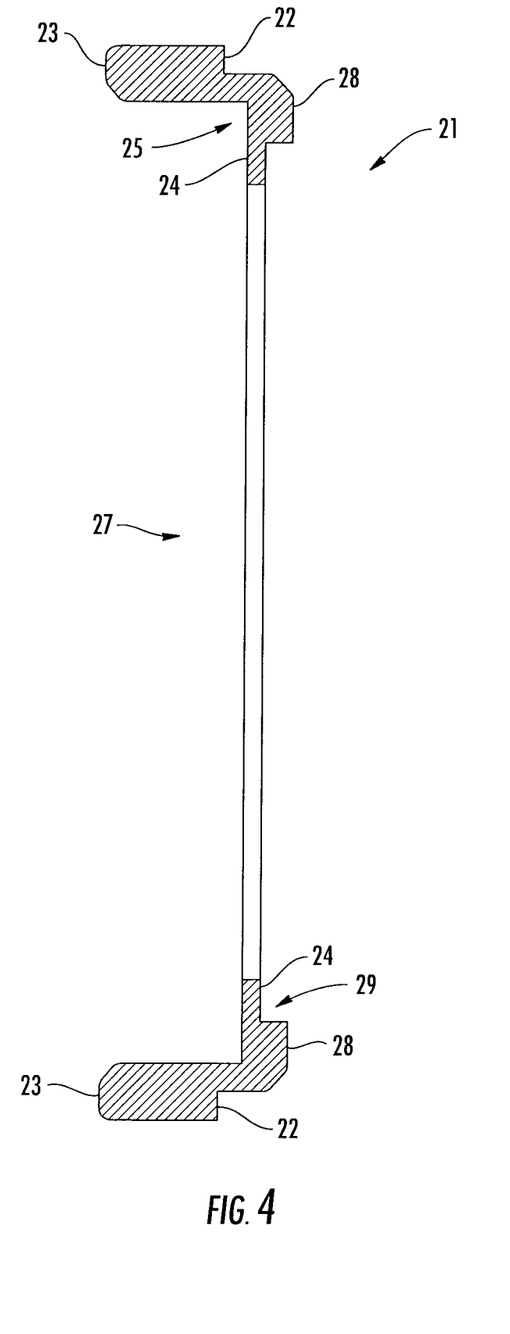
FIG. 4 is a section view of a centering frame of the device of FIG. 2, taken along the line 3-3 in FIG. 2.

A centering frame 21 is mountable at a hole 19 in a wall 18 of the junction box. FIG. 2 shows the centering frame 21 mounted in the hole 19. Referring also to FIG. 4, which is a section view taken along the line 4-4 in FIG. 2, the centering frame 21 includes a first rim 23 and a flange 24 defining a first seat 25. An inner edge 26 of the flange 24 defines a central opening 27. The centering frame 21 includes a second rim 28 opposite the first rim 23, the flange 24 being disposed between the first rim and the second rim. The second rim 28 and the flange 24 define a second seat 29. Between the first rim 23 and the second rim 28 is a shoulder 22 that fits into the inner edge of the hole 19. The centering frame 21 may be secured to the wall 18 in an appropriate manner, for example, welding or adhesive bonding.

The first clamping plate 30 is upon assembly disposed on a first side of the centering frame 21 in the first seat 25 and with the fastening post 34 extending through the central opening 27. The second clamping plate 40 upon assembly is disposed on a second side of the centering frame 21 opposite the first side. As shown in FIG. 3, the second clamping plate 40 is seated in the second seat 29 with the fastening post 34 received in the second clamping plate aperture 44. As mentioned, the cable passage holes 32 of the first clamping plate 30 are aligned with the cable passage holes 42 of the second clamping plate 40 to define a plurality of cable passages.

The sealing membrane 50 is disposed between the first clamping plate 30 and the flange 24 of the centering frame 21 and is compressed at its periphery to provide a water- and dust-tight seal. When the sealing membrane 50 is assembled between the first clamping plate 30 and the second clamping plate 40, portions of the sealing membrane are interposed and exposed at the plurality of cable passages. At least one exposed membrane portion has a perforation 52 (shown in FIG. 2) to accept a cable in a sealing manner. According to one aspect of the invention, the perforation 52 in the membrane 50 is configured for a press fit with a cable for that cable passage to provide a water-tight and dust-tight seal.

According to an aspect of the invention, the sealing membrane 50 is a sheet of a material sufficiently resilient so that the edge of the perforation 52 can conform to the cable inserted through the perforation, and an edge of the membrane aperture 54 can conform with the fastening post 34, while being sufficiently stiff to maintain the shape of the perforation and aperture. The sealing membrane 50 may be formed of vinyl or another suitable material.

Figure 5:
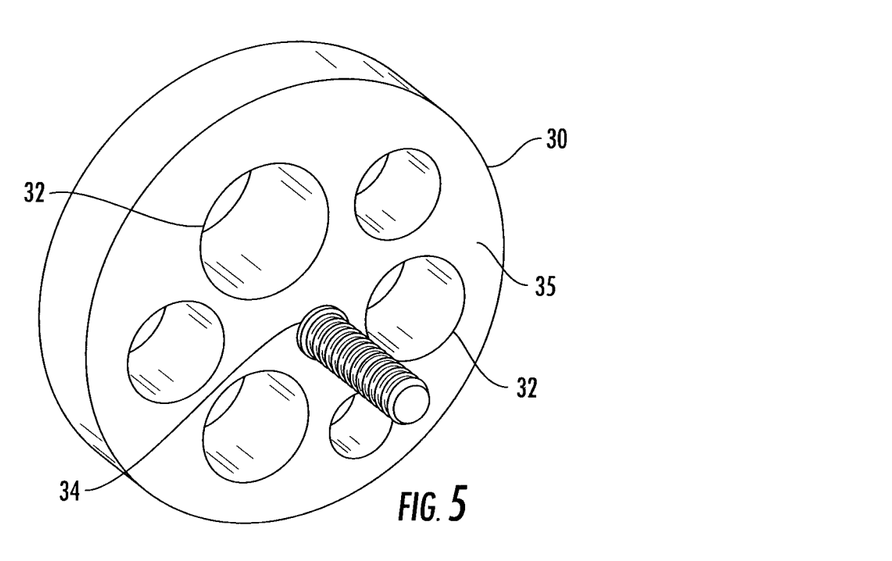
FIG. 5 is a view of a first clamping plate showing an interfacing side.

FIG. 5 is a view of the first clamping plate 30 showing an interfacing surface 35. The interfacing surface 35 faces the centering frame 21 and sealing membrane 50 when the device 20 is assembled. The fastening post 34 extends from the interfacing surface 35. The fastening post 34 may be molded into the first clamping plate 30 or, alternatively, a through hole may be provided in the first clamping plate to carry the fastening post.

Figure 6:
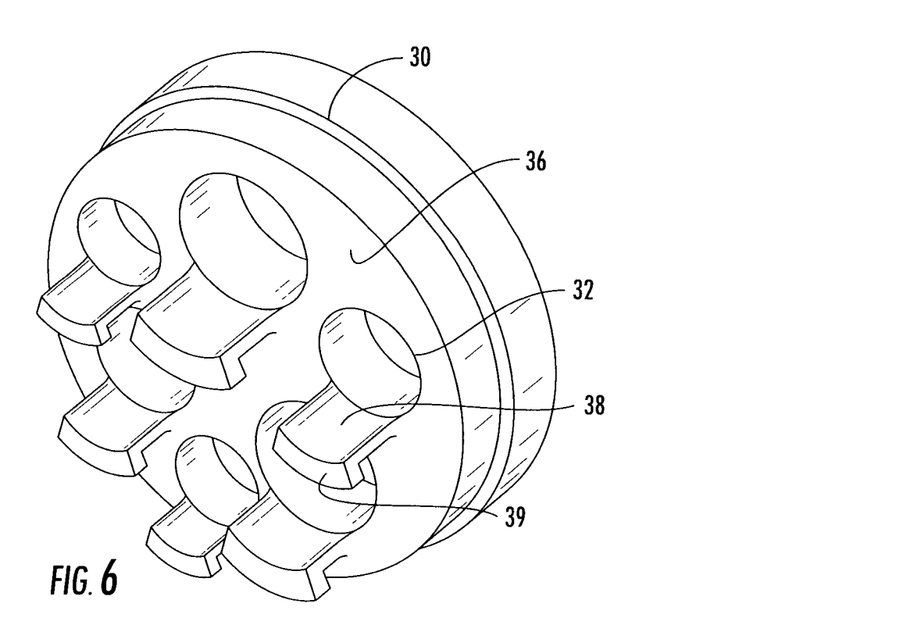
FIG. 6 is another view of the first clamping plate showing an external side.

FIG. 6 is a view of an external face 36 of the first clamping plate 30, which is opposite the interfacing surface 35 shown in FIG. 5 and faces the engine compartment when the device is installed on a junction box (See, FIG. 1). A plurality of cable support cradles 38, one formed at each of the cable passage holes 32, is formed to extend, preferably perpendicularly, from the external face 36. The cable support cradles 38 guide and support the cables passing through the cable sealing device 20. Each cable support cradle 38 includes a lip 39. Each cable may be secured to a cable support cradle 38 by a cable tie and the lip 39 prevents the cable tie from sliding off the cable support cradle.

FIG. 6 shows the cable support cradles 38 as formed on the first clamping plate. Alternatively, or in addition, the second clamping plate 40 may include a cable support cradle at each of the cable passage holes 42.

According to the embodiment of FIGS. 2 to 6, the first clamping plate 30 and the second clamping plate 40 are circularly-shaped or disc-shaped. Conveniently, disc-shaped clamping plates 30, 40 allow for a single fastening post 34 to secure the clamping plates to the centering frame 21. In this embodiment, the fastening post 34 and the aperture 44 in the second clamping plate 40 are centrally located.

Figure 7:
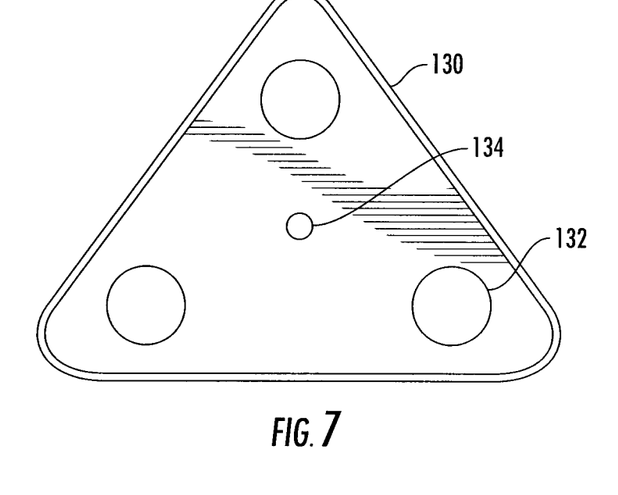
FIG. 7 is a plan view of a clamping plate according to another embodiment of the invention; and, FIG. 8 is a plan view of a clamping plate according to yet another embodiment of the invention.

According to an alternative embodiment, the first clamping plate 130 and the second clamping plate are triangular in shape. FIG. 7 shows the first clamping plate with cable passage holes 132 and a fastening post 134. A second clamping plate according to this embodiment is similarly shaped and has a similar pattern of cable passage holes 132. The triangular shape allows for a single, centrally-located fastening post 134 in the first clamping plate 130 and a single, centrally-located aperture in the second clamping plate. A sealing membrane according to this embodiment is also triangularly-shaped.

Figure 8:
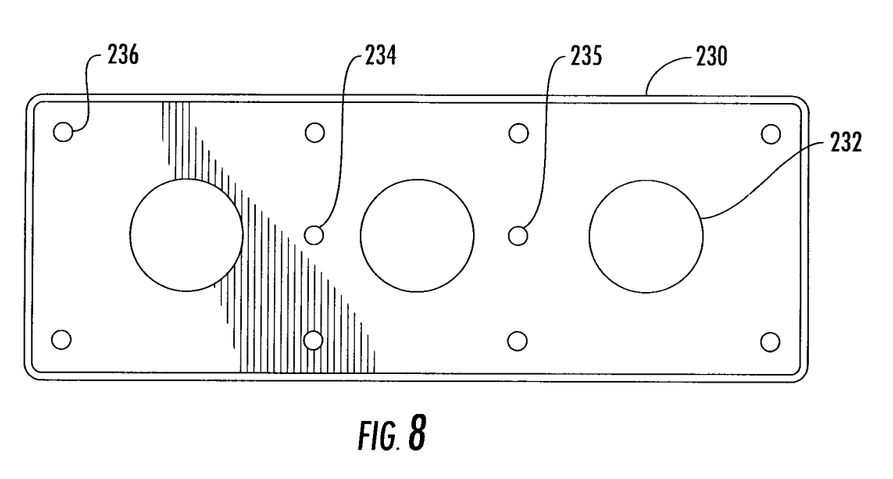

According to another alternative embodiment, the first clamping plate and the second clamping plate are rectangular in shape. FIG. 8 shows a first clamping plate 230 and three cable passage holes 232. According to one aspect of the invention, the rectangular first clamping plate 230 has two fastening posts, a first fastening post 234 and a second fastening post 235, both located at a central portion of the first clamping plate. The second clamping plate is similarly shaped and has the same arrangement of cable passage holes. The second clamping plate has a first aperture and a second aperture located at a central portion of the second clamping plate. According to an alternative embodiment, the first clamping plate 230 may have a plurality of fastening posts 236 arranged about the periphery of the first clamping plate. The second clamping plate in this embodiment has an equal plurality of apertures arranged at its periphery.

The invention has been described in terms of specific embodiments, structure, and components for the purpose of explaining the invention as recited by the following claims.

The invention claimed is:

1. A cable sealing device for an electrical junction box, comprising:
    a centering frame mountable at a hole in a wall of the electrical junction box, the centering frame including a first rim and a flange defining a first seat, an edge of the flange defining a central opening;
    a first clamping plate having a plurality of cable passage holes, the first clamping plate being disposed on a first side of the centering frame within the first seat;
    a second clamping plate having a plurality of cable passage holes corresponding to the plurality of cable passages holes of the first clamping plate, the second clamping plate being disposed on a second side of the centering frame opposite the first side wherein the plurality of cable passage holes of the first clamping plate are aligned with the plurality of cable passage holes of the second clamping plate to define a plurality of cable passages extending through the central opening of the centering frame; and
    a sealing membrane disposed between the first clamping plate and the flange of the centering frame, wherein portions of the sealing membrane are exposed at the plurality of cable passages and wherein at least one exposed membrane portion has a perforation to accept a cable.

2. The cable sealing device of claim 1, wherein the first clamping plate has a fastening post extending from a surface thereof, the first clamping plate being disposed on a first side of the centering frame within the first seat with the fastening post extending through the central opening.

3. The cable sealing device of claim 2, wherein the second clamping plate has an aperture to receive the fastening post.

4. The cable sealing device of claim 3, further comprising a threaded nut engaged on a portion of the fastening post extending from the second clamping plate, the fastening post and threaded nut applying clamping force to the first clamping plate and second clamping plate.

5. The cable sealing device of claim 2, wherein the sealing membrane has an aperture to receive the fastening post.

6. The cable sealing device of claim 2, wherein the fastening post is molded into the first clamping plate.

7. The cable sealing device of claim 2, wherein the fastening post is carried in a post hole formed in the first clamping plate.

8. The cable sealing device of claim 1, wherein the centering frame comprises a second rim opposite the first rim, the flange being disposed between the first rim and the second rim, the second rim defining a second seat.

9. The cable sealing device of claim 8, wherein the second clamping plate is disposed in the second seat.

10. The cable sealing device of claim 1, wherein the first clamping plate comprises a cable support cradle at each of the plurality of cable passage holes.

11. The cable sealing device of claim 1, wherein the second clamping plate comprises a cable support cradle at each of the plurality of cable passage holes.

12. The cable sealing device of claim 1, wherein the perforation in the sealing membrane is configured for a press fit with a cable for that cable passage to provide a water-tight seal.

13. The cable sealing device of claim 1, wherein the first clamping plate and the second clamping plate are disc shaped and comprising a fastening post extending from the first clamping plate through an aperture in the second clamping plate, wherein the fastening post and aperture are centrally located.

14. The cable sealing device of claim 1, wherein the first clamping plate and the second clamping plate are triangular, and comprising a fastening post extending from the first clamping plate through an aperture in the second clamping plate, wherein the fastening post and the aperture are centrally located.

15. The cable sealing device of claim 1, wherein the first clamping plate and the second clamping plate are rectangular, and comprising a first fastening post and a second fastening post extending from the first clamping plate through a respective first aperture and second aperture in the second clamping plate, the first fastening post and the second fastening post being located at a central portion of the first clamping plate, and the first aperture and the second aperture being located at a central portion of the second clamping plate.

16. The cable sealing device of independent claim 1, wherein:
    the centering frame comprises a second rim opposite the first rim, the flange being disposed between the first rim and the second rim, the first clamping plate is disposed on a first side of the centering frame within the first seat, the second clamping plate is disposed on a second side of the centering frame within a second seat defined by the second rim, a shoulder is positioned between the first rim and the second rim and is configured to at least partially extend into the hole in the one of said walls;
    the first clamping plate is disc shaped and has a fastening post centrally located in and extending from the first clamping plate through the central opening of the centering frame, the first clamping plate comprises a cable support cradle at each of the plurality of cable passage holes, each cable support cradle including a lip extending away from the corresponding cable passage hole of the plurality of cable passage holes, and an inner edge of the flange defines a central opening;
    the second clamping plate is disc shaped and has an aperture to receive the fastening post, the fastening post extends through an aperture centrally located in the second clamping plate, the second clamping plate comprises a cable support cradle at each of the plurality of cable passage holes, each cable support cradle including a lip extending away from the corresponding cable passage hole of the plurality of cable passage holes;
    the sealing membrane comprises a sheet of material with an aperture centrally located in the sealing membrane to receive the fastening post therethrough, the perforation in the sealing membrane is configured for a press fit with a cable for that cable passage to provide a water-tight seal, the sealing membrane compressed at a periphery between the first clamping plate and the flange of the centering frame; and the cable sealing device further comprises a threaded nut engaged on a portion of the fastening post extending from the second clamping plate, the fastening post and threaded nut applying clamping force to the first clamping plate and second clamping plate such that the shoulder of the centering frame and the second clamping plate provide a clamping force on the wall.

17. An electrical junction box for a vehicle, comprising:

a box having walls defining an enclosed interior space and a door allowing access to the enclosed interior space, one of said walls having a hole;

a centering frame mounted at the hole in one of said walls, the centering frame including a first rim extending perpendicular to an exterior surface of the one of said walls, a flange extending parallel to the one of said walls within the first rim and defining a central opening, and a second rim extending perpendicular to an interior surface of the one of said walls;

a first clamping plate having a plurality of cable passage holes and having a post extending from a surface thereof, the first clamping plate being disposed on a first side of the centering frame within the first rim and with the post extending through the central opening;

a second clamping plate having a plurality of cable passage holes corresponding to the plurality of cable passages holes of the first clamping plate and a centrally-located aperture to receive the post, the second clamping plate being disposed on a second side of the centering frame opposite the first side with the post received in the aperture and wherein the plurality of cable passage holes of the first clamping plate are aligned with the plurality of cable passage holes of the second clamping plate to define a plurality of cable passages extending through the central opening of the centering frame; and a sealing membrane disposed between the first clamping plate and the flange of the centering frame, wherein the sealing membrane has a centrally-located aperture to receive the post, wherein portions of the sealing membrane are exposed at the plurality of cable passages and wherein at least one exposed membrane portion has a perforation to accept a cable.

18. The cable sealing device of independent claim 17, wherein:

the centering frame comprises a second rim opposite the first rim, the flange being disposed between the first rim and the second rim, the first clamping plate is disposed on a first side of the centering frame within the first seat, the second clamping plate is disposed on a second side of the centering frame within a second seat defined by the second rim, a shoulder is positioned between the first rim and the second rim and is configured to at least partially extend into a hole in a wall;

the first clamping plate is disc shaped and has a fastening post centrally located in and extending from the first clamping plate through the central opening of the centering frame, the first clamping plate comprises a cable support cradle at each of the plurality of cable passage holes, each cable support cradle including a lip extending away from the corresponding cable passage hole of the plurality of cable passage holes, and an inner edge of the flange defines a central opening;

the second clamping plate is disc shaped and has an aperture to receive the fastening post, the fastening post extends through an aperture centrally located in the second clamping plate, the second clamping plate comprises a cable support cradle at each of the plurality of cable passage holes, each cable support cradle including a lip extending away from the corresponding cable passage hole of the plurality of cable passage holes;

the sealing membrane comprises a sheet of material with an aperture centrally located in the sealing membrane to receive the fastening post therethrough, the perforation in the sealing membrane is configured for a press fit with a cable for that cable passage to provide a water-tight seal, the sealing membrane compressed at a periphery between the first clamping plate and the flange of the centering frame; and the cable sealing device further comprises a threaded nut engaged on a portion of the fastening post extending from the second clamping plate, the fastening post and threaded nut applying clamping force to the first clamping plate and second clamping plate such that the shoulder of the centering frame and the second clamping plate provide a clamping force on the wall.

* * * * *